United States Patent [19]

Yang

[11] Patent Number: 5,175,205

[45] Date of Patent: Dec. 29, 1992

[54] LOW VISCOSITY CARBOXYLATED LATEX

[75] Inventor: Philip Y. Yang, Bay Village, Ohio

[73] Assignee: The B. F. Goodrich Company, Akron, Ohio

[21] Appl. No.: 784,869

[22] Filed: Oct. 30, 1991

[51] Int. Cl.⁵ .............................................. C08L 31/00
[52] U.S. Cl. ................................... 524/556; 524/562; 524/833
[58] Field of Search ................. 524/556, 833

[56] References Cited

U.S. PATENT DOCUMENTS

| | | | |
|---|---|---|---|
| 3,793,244 | 2/1974 | Megee et al. | 524/556 X |
| 3,970,629 | 7/1976 | Izaki et al. | 524/556 X |
| 4,069,188 | 1/1978 | Canard et al. | 524/556 |
| 4,395,499 | 7/1983 | Rosenski et al. | 524/556 X |
| 4,438,232 | 3/1984 | Lee | 524/556 X |
| 4,446,273 | 5/1984 | Hiyoshi et al. | 524/556 |
| 4,522,972 | 6/1985 | Mond't et al. | 524/556 X |
| 4,725,655 | 2/1988 | Denzinger et al. | 524/833 X |
| 4,788,008 | 11/1988 | Neubert | 524/556 X |
| 4,876,293 | 10/1989 | Durney et al. | 524/556 X |
| 4,937,283 | 6/1990 | Pfoehler et al. | 524/833 X |
| 5,037,880 | 8/1991 | Schmidt et al. | 524/556 X |
| 5,039,764 | 8/1991 | Steinwand | 524/556 X |
| 5,098,948 | 3/1992 | Kawabata | 524/556 X |

FOREIGN PATENT DOCUMENTS 1412907  11/1975  European Pat. Off.

Primary Examiner—Joseph L. Schofer
Assistant Examiner—J. M. Reddick
Attorney, Agent, or Firm—George W. Moxon, II; Daniel J. Hudak

[57] ABSTRACT

A latex system can be made from a combination of acids in a base monomer wherein methylenesuccinic acid is used with at least one other monocarboxylic acid.

The latex system provides a high pH latex that can be used to treat fiber substrates or alternatively can be blended with other latexes to form coatings.

12 Claims, No Drawings

LOW VISCOSITY CARBOXYLATED LATEX

FIELD OF THE INVENTION

This invention relates to carboxylated latex which has low viscosity at high pH. A latex system made from ethylenically unsaturated monomers with methylenesuccinic acid and at least one additional monocarboxylic acid monomer is disclosed. This latex can be used in fibrous material binding, paper saturation, and paper coating.

BACKGROUND OF THE INVENTION

It is well known that carboxylation may be used to increase latex colloidal stability, provide functional sites for further reaction, and increase adhesion properties and surface characteristics Providing functional sites for further reaction is particularly important to fibrous materials binding and paper saturation. The increase in adhesion properties and surface characteristics is important for coating applications.

The degree of carboxylation is measured by acid number. Acid number is defined as the number of milligrams of potassium hydroxide required to neutralize the free acid in the polymer. Generally, increasing the degree of carboxylation increases the viscosity of a latex. This increase of viscosity due to increase of carboxylation is further amplified at higher pH values and at higher total solid levels. These higher pH values and higher total solids become critical in various applications such as in fibrous materials binding, paper saturation, and coating applications.

European Patent No. 1,412,907 to Tajima assigned to Sumitomo Naugatuck Co., LTD discloses copolymer latex and paper coating compositions thereof. This patent discloses conjugated diolefin copolymer latexes, preferably butadiene latexes, combined with an alkyl ester of an unsaturated carboxylic acid, and a hydroxy alkyl-containing unsaturated monomer, an unsaturated carboxylic acid monomer, and an alkenyl aromatic monomer.

It is an important aspect of this invention to provide a latex that contains an acid mixture with at least one acid being methylenesuccinic acid.

SUMMARY OF THE INVENTION

In the first embodiment, the invention provides a carboxylic latex system for use in coating and saturation of fiber substrates wherein one or more acidic ethylenically unsaturated monomers comprising methylenesuccinic acid and at least one additional monocarboxylic acid is used. It is an advantage of the present invention to provide a low viscosity latex that can maintain its low viscosity at high pH values.

It is a further advantage of the present embodiment to provide a composition useful for paper saturation wherein the acidity is maintained at neutral or high pH to prevent paper degradation.

Still a further advantage of the present invention is to allow the increase of total solids of the latexes to allow faster drying while not increasing the viscosity beyond the point of detrimental coagulation.

Still a further advantage of the present invention is to allow the latex to be adjusted to high pH values while maintaining its viscosity, before it is blended with a second system such as a polyfunctional aziridine or vinyl chloride latex. In these instances, adjusting the latex to a high pH is essential to the blends' colloidal stability.

DETAILED DESCRIPTION OF THE INVENTION

This invention relates to a carboxylated latex which has a low viscosity at high pH. The latex system comprises the polymerization product made from a) generally from about 0.1 to about 10 parts per hundred parts of monomers by weight (phm) of methylenesuccinic acid;
b) generally from about 0.1 to 10 phm of at least one additional carboxylic acid monomer; and
c) at least one copolymerizable monomer having at least one terminal $CH_2=C<$ group, the amount thereof being the remainder of the monomers to equal 100 phm by weight.

The copolymerizable monomer having at least one terminal $CH=C<$ group is preferably an alkyl ester of acrylic or methacrylic acid and may comprise one monomer or combinations of monomers. The alkyl portion of the ester substituent has from about 1 to about 18 carbon atoms; preferably from about 1 to about 12 carbon atoms; and most preferably from about to about 8 carbon atoms. Other comonomers may be added in minor amounts and are intended to be covered within the ranges given. The term "minor amount" is used here to mean an amount which doesn't negatively impact on the desired properties. By way of example, such a comonomer might be a relatively low amount of an ethylenically unsaturated monomer, such as ethylene vinyl acetate, or the like. Specific examples of the alkyl esters of acrylic or methacrylic acid which are suitable include butyl acrylate, ethyl acrylate, and 2-ethylhexyl acrylate. Most preferably this monomer is ethyl acrylate. The amount of this component is the amount remaining from 100 parts of monomer (phm) by weight after subtracting from 100 the total of the other monomeric components.

The acidic ethylenically unsaturated monomer has as one of its components methylenesuccinic acid. Methylenesuccinic acid is also known as itaconic acid and has the formula $CH_2=C(COOH)CH_2COOH$. Methylenesuccinic acid is generally provided as a white, odorless hygroscopic crystals with a melting point of from about 167° to about 168° C.

The amount of methylenesuccinic acid is generally from about 0.1 to about 10 phm. Desirably the amount of methylenesuccinic acid is generally from about 0.5 to 6 phm and preferably the amount of methylenesuccinic acid is from about 0.5 to about 3 phm.

The second component of the acid ethylenically unsaturated monomer comprises at least one additional monocarboxylic acid. This second acid may be any mono acid containing a polymerizable double bond generally known to the art and to the literature. The preferred acids are methacrylic or acrylic acid. The amount of the monocarboxylic acid is generally from about 0.1 to about 10 phm. Desirably the amount of monocarboxylic acid is from about 0.2 to about 5 phm and preferably from about 0.5 to about 2 phm. The total amount of acidic ethylenically unsaturated monomer is generally from about 20 to about 0.2 phm.

The latexes of the present invention are made by emulsion polymerization generally known to the art and to the literature. This emulsion polymerization generally requires an initiator and an emulsifier and these ingredients are those generally known to the art.

The initiators are generally used at from about 0.5 to about 2 phm by weight and preferably from about 0 to about 1 phm. Such compounds generally include salts of peroxydisulfate, as well as the combination of oxidizing and reducing agents, i.e. "redox systems." The latter category includes the following:

| Oxidizing Agents | Reducing Agent |
| --- | --- |
| $NH_4K_2S_2O_8$ or | $Na_2S_2O_4$ |
| $H_2O_2$ and | $ZnS_2O_4$ |
| $(CH_3)_3COOH$ | $NaHSO_2CH_2O2H_2O$ |
| | $Na_2S_2O_5$ |

Initiators may be used alone or in combination. These may be added separately or together according to the time point during the polymerization process at which they are added. Emulsifiers are generally used in the present invention from about 0 to about 10 phm, and preferably from about 0.5 to about 7 phm. These compounds are known in the art and include saturated fatty acids, alkyl sulfates, alkyl sulfonates, alkyl benzene sulfonates, di-n-alkyl sulfosuccinates, ether alcohol sulfates, and polyoxyethylene nonyl phenyl ethers.

Additional additives may be added as are known in the art including but not limited to electrolytes, pH control agents, and pigments.

The emulsion polymerization reaction which was used to produce the samples of the examples is set forth below. All the monomers can be premixed in the reactor, but generally it is preferred to have the methylenesuccinic acid present initially in the reactor and then add the remaining acids to the reactor.

The emulsion temperature range is generally from about 25° C. to about 95° C., desirably from about 45° C. to about 90° C., and preferably from about 45° C. to about 90° C., and most preferably from 70° C. to 85° C. with this temperature being based on the type of initiator used.

By way of example, the emulsion polymerization reaction which was used to produce the samples of the examples is set forth below.

A monomer premix was made and comprised the monomers, a major portion of the emulsifier and approximately half of the demineralized water at ambient temperature. The reactor was subsequently charged with the remaining minor amount of the emulsifier, a major amount of initiator, pH control agent, and the remaining demineralized water. This aqueous mixture was brought to reaction temperature in a nitrogen blanket, about 80° C., and the monomer premix was metered in over a three hour period while the temperature was maintained between 75° C. and 85° C. At the end of this period aliquots of additional initiators were added at timed sequences. The reaction was allowed to run an additional 2.5 hours to complete the reaction. During the last hour, the temperature was maintained at 40° C. In general, the solid contents of the resulting latex was near 50 percent. This could be varied depending up the desired solids content.

The Brookfield viscosity of the formed polymers was measured at 60 rpm.

Tensile characteristics were tested following the guidelines set forth in TAPPI T494 om-81. The samples were cut to 15 mm × 152.4 mm along the machine direction for these tests. Tensile strength was measured at 12 inch per minute cross-head speed. To measure wet tensile strength, the samples were soaked for 20 minutes in a 1 percent solution of surfactant, octylphenoxypoly-ethoxyethanol. Total stretch is the elongation at break. Tearing resistance (tear sum) was measured according to TAPPI-496 SU-64. The results of these tests are set forth in Table II.

TABLE I

Latexes were prepared by emulsion polymerization, using 1.88 phm (parts per hundred monomer weight) of sodium lauryl sulfate as emulsifier, and 0.22 phr ammonium persulfate as initiator. Methylenesuccinic acid was added initially into the reactor. A major part of the water and a minor portion of the emulsifier were charged into a reactor while stirring. The remainder of the water, emulsifier and 0.15 phm of potassium hydroxide were blended with the monomers to form an emulsion. The reactor was kept at 80° C., the initiator was then charged into the reactor, and the monomer emulsion was metered evenly into the reactor over three hours to complete the conversion into latex. The final total solids are about 49 percent. The compositions of latexes are listed in the following table:

TABLE I

| | Latex Compositions | | |
| --- | --- | --- | --- |
| LATEX | ETHYL ACRYLATE (phm) | ACRYLIC ACID (phm) | METHYLENE-SUCCINIC ACID (phm) |
| A | 95 | 5 | — |
| B | 95 | — | 5 |
| C | 95 | 3 | 2 |

Latexes were diluted to 30 percent total solids and the pH was adjusted to 7.5 with ammonium hydroxide. Two phr (parts per hundred resin weight) of polyfunctional axiridine (XAMA 7 ®, by Hoochet Celanese) was then added to the latexes. Table II shows the viscosity of the latexes:

TABLE II

| | Latex Viscosity (cps) | | | |
| --- | --- | --- | --- | --- |
| Latex | PH 6 | 7 | 7.5 | After XAMA-7 |
| A | 8 | 21 | 180 | 1160 |
| B | 41 | 105 | 181 | 3950 |
| C | 12 | 39 | 118 | 498 |

TABLE III

| | Saturated Paper Properties | | | |
| --- | --- | --- | --- | --- |
| | Dry Tensile (kg/1.5 cm) | Total Stretch (%) | Wet Tensile (kg/1.5 cm) | Tear Sum (gm) |
| After Drying | | | | |
| Base Paper | 3.1 | 1.3 | 0.03 | — |
| Latex A | 6.9 | 4.4 | 0.95 | 105 |
| Latex C | 7.1 | 4.8 | 0.97 | 112 |
| After Aging | | | | |
| Latex A | 7.2 | 4.7 | 2.6 | 103 |
| Latex C | 6.8 | 4.2 | 4.0 | 107 |

A base paper was saturated with Latex A and C, pressed between two rollers to squeeze out the excess latex and then dried on a steam heated can at 98° C. for one minute. This was followed by aging at 140° C. for 30 minutes. The pickup resulting from Latex C was 51.8 percent compared to 49.1 percent for latex A. Latex B was too viscous for saturation.

Table III demonstrates the properties of the saturated paper. From Table III, it can be seen that latex carboxylated with multiple acids provides benefits that are unattainable from the latex carboxylated with only one type of acid. The lower viscosity allows easier saturation. The wet tensile strength is unexpectedly higher. In addition, better tear properties are observed. This demonstrates the unexpected synergistic effect found when using two acids.

The latexes in Table IV were made in a stirred polymerization reactor as generally set forth in Table I with the modifications in Table IV:

TABLE IV

| | Latex Compositions | | | |
|---|---|---|---|---|
| Latex | Ethyl acrylate (phm) | Methyl methacrylate (phm) | Acrylic Acid (phm) | Methylene-succinic Acid (phm) |
| D | 87.85 | 10 | 0.65 | 1.5 |
| E | 87.4 | 10 | 2.6 | — |
| F | 88 | 10 | — | 2 |

The polymers of latexes D, E, F, and G (a commercially available acrylic latex) all have an acid number of 20. The acid number which represents the degree of carboxylation was measured by dissolving the latex polymer in pyridine, followed by titrating with 0.02 N KOH in methanol using thymolphthalein as the indicator. The glass transition temperature of the latex polymers was $-5°$ C. The latexes were diluted with water to various amounts of total solids. The pH was adjusted using 28 percent ammonium hydroxide. The viscosity was measured using a Brookfield viscometer at 60 rpm. The viscosity results are listed in Table V.

TABLE V

| LATEX | T.S. (%) PH | 6.0 | 6.5 | 7.0 | 7.5 | 8.0 | 8.5 | 9.0 | 9.5 |
|---|---|---|---|---|---|---|---|---|---|
| D | 30 | 6 | 7 | 7 | 8 | 9 | 9 | 10 | 11 |
|  | 35 | 8 | 8 | 9 | 10 | 11 | 13 | 15 | 16 |
|  | 40 | 11 | 12 | 13 | 18 | 21 | 27 | 33 | 38 |
| E | 40 | 11 | 12 | 12 | 13 | 28 | 670 | >1000 | >1000 |
| F | 30 | 6 | 7 | 9 | 10 | 11 | 12 | 13 | 15 |
|  | 40 | 17 | 21 | 30 | 41 | 56 | 90 | 125 | 153 |
| G | 30 | 7 | 8 | 11 | 13 | 21 | 41 | 78 | 108 |
|  | 35 | 8 | 10 | 17 | 49 | 140 | 284 | 489 | 760 |
|  | 40 | 16 | 42 | 188 | 435 | >1000 | >1000 | >1000 | >1000 |

Table V demonstrates that latex made according to the present invention exhibits the lowest viscosity even at high pH values.

While in accordance with the patent statutes, the best mode and preferred embodiment has been set forth, the scope of the invention is not limited thereto, but rather by the scope of the attached claims.

What is claimed is:

1. A latex system comprising: the polymer product made from
   a) 0.1 to 10 phm of methylenesuccinic acid;
   b) 0.1 to 10 phm of at least one mono-carboxylic acid monomer; and
   c) at least one copolymerizable monomer having at least one terminal $CH_2=C<$ group, the amount of said copolymerizable monomer being the remainder of the monomers to equal 100 phm by weight; and wherein said polymer has an acid number of at least 10.

2. The latex system as in claim 1, wherein the amount of methylenesuccinic acid is from 0.5 to 6 phm.

3. The latex system as in claim 1, wherein the amount of said monocarboxylic acid monomer is from about 0.2 to 5 phm.

4. The latex system as in claim 1, wherein the Brookfield viscosity of said latex is below 100 cps at 40 percent total solids, and a pH range of from about 8.5 to about 9.5.

5. The latex system as in claim 1, wherein the Brookfield viscosity of said latex is below 80 cps at 40 percent total solids, and a pH range of from about 8.5 to about 9.5.

6. The latex system as in claim 1, wherein the Brookfield viscosity of said latex is below 50 cps at 40 percent total solids, and a pH range of from about 8.5 to about 9.5.

7. The latex system as in claim 2, wherein the Brookfield viscosity of said latex is below 100 cps at 40 percent total solids, and a pH range of from about 8.5 to about 9.5.

8. The latex system as in claim 3, wherein the Brookfield viscosity of said latex is below 80 cps at 40 percent total solids, and a pH range of from about 8.5 to about 9.5.

9. The latex system as in claim 4, wherein the Brookfield viscosity of said latex is below 50 cps at 40 percent total solids, and a pH range of from about 8.5 to about 9.5.

10. The latex system as in claim 1, wherein the amount of methylenesuccinic acid is 0.5 to about 3 phm.

11. The latex system as in claim 1, wherein the amount of monocarboxylic acid monomer is from about 0.5 to about 2 phm.

12. The latex system as in claim 10, wherein the Brookfield viscosity of said latex is below 100 cps at 40 percent total solids, and a pH range of from about 8.5 to about 9.5.

* * * * *